(12) United States Patent
Biasiolli et al.

(10) Patent No.: US 11,514,532 B1
(45) Date of Patent: Nov. 29, 2022

(54) TRANSACTION DATA TRANSFER MANAGEMENT

(71) Applicant: United Services Automobile Association (USAA), San Antonio, TX (US)

(72) Inventors: David Thomas Biasiolli, San Antonio, TX (US); David Hugh Doyal, Helotes, TX (US); Steve Rubalcaba, San Antonio, TX (US); Brian Michael Beard, San Antonio, TX (US); Jeffrey Andrew Dixon, San Antonio, TX (US); Paul Edward Ortiz, Bulverde, TX (US); Josh Matthew Williams, San Antonio, TX (US); Jason Paul Hendry, Selma, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 16/439,473

(22) Filed: Jun. 12, 2019

Related U.S. Application Data

(60) Provisional application No. 62/683,831, filed on Jun. 12, 2018.

(51) Int. Cl.
  *G06Q 40/00* (2012.01)
  *G06F 16/23* (2019.01)
(52) U.S. Cl.
  CPC ......... *G06Q 40/12* (2013.12); *G06F 16/2365* (2019.01)

(58) Field of Classification Search
  USPC .......................................................... 705/30
  See application file for complete search history.

(56) References Cited

U.S. PATENT DOCUMENTS

| | | | |
|---|---|---|---|
| 8,468,271 B1 | 6/2013 | Panwar et al. | |
| 2003/0204456 A1* | 10/2003 | Engdahl | G06Q 40/128 705/30 |
| 2006/0226216 A1 | 10/2006 | Keithley et al. | |
| 2015/0215305 A1 | 7/2015 | Wetzel et al. | |
| 2015/0269629 A1 | 9/2015 | Lo et al. | |
| 2016/0234140 A1 | 8/2016 | Sirpal et al. | |
| 2017/0108852 A1 | 4/2017 | Tirado | |
| 2018/0232730 A1* | 8/2018 | Harbour | G06Q 30/0201 |
| 2018/0268418 A1* | 9/2018 | Tanksali | G06Q 30/012 |

* cited by examiner

*Primary Examiner* — Peter Ludwig
*Assistant Examiner* — Reva R Moore
(74) *Attorney, Agent, or Firm* — Fish & Richardson P.C.

(57) ABSTRACT

Techniques are described for managing data transfer between an enterprise system and a third-party provider system, through a batch interface of the third-party provider system. A batch of transaction data is uploaded through the batch interface for enrichment, and enrichment data is received in response. The enrichment data provides additional context regarding each of the transactions specified in the uploaded batch. The enrichment data can be sent back to the presented to user(s) through various tools. Prior to uploading, the batch can be filtered to include those records corresponding to users who have opted into a service. Filtering can also exclude records for which enrichment data has already been provided through a real-time process. Reconciliation can be performed to ensure integrity of the communicated data.

17 Claims, 4 Drawing Sheets

TRANSACTION DATA TRANSFER MANAGEMENT

CROSS-REFERENCE TO RELATED APPLICATION

This application claims priority under 35 U.S.C. § 119 to U.S. application Ser. No. 62/683,831, filed on Jun. 12, 2018, and entitled "Transaction Data Transfer Management," the entire contents of which is incorporated by reference herein.

BACKGROUND

Entities such as enterprises can provide applications that enable users to access products and/or services provided by the entities. For example, an entity can provide a web application and/or a mobile application through which users can access products and/or services over a network such as the internet. In some examples, an application includes a page (e.g., a web page) that displays information to the user, and that provides one or more interfaces, through which the user can interact with the application. In some instances, an entity can partner with a third-party provider to enable user access, through the application of the entity, to products, services, and/or information provided by the third-party provider. For example, an interface associated with an application of the third-party provider can be embedded within a page of the entity's application. In this manner, the user can access the products, services, and/or information of the third-party provider directly through the application provided by the entity.

SUMMARY

Implementations of the present disclosure are generally directed to data communications between an enterprise system and a third-party provider system. More specifically, implementations are directed to managing the transfer of batches of transaction data from the enterprise system to a third-party provider system, and receiving from the third-party provider system enrichment data associated with the transaction data, in which the transferred batches may be filtered for transfer efficiency and in which reconciliation data can be employed to confirm the integrity of the data transfer process.

In general, innovative aspects of the subject matter described in this specification can be embodied in methods that include operations of: receiving transaction records that are each associated with a transaction; filtering the transaction records to select a subset of the transaction records; and communicating, to a batch processing interface of an external service, a batch file that includes the subset of the transaction records and, in response, receiving enrichment data generated by the external service, the enrichment data including enrichment data records that each describes a respective transaction associated with a respective one of the subset of the transaction records.

Implementations can optionally include one or more of the following features: the external service further provides a real time processing interface and is configured to generate a respective individual enrichment data record in real time for each individual transaction record received through the real time processing interface; the filtering includes selecting the subset of the transaction records for which an individual enrichment data record has not already been generated based on a request to the real time processing interface; the filtering includes selecting the subset of the transaction records associated with transactions that involve users listed in a subscriber database; the operations further include reducing a width of the subset of the transaction records, prior to communicating the batch file to the batch processing interface of the external service, by removing at least one data field from each of the subset of the transaction records; each of the subset of the transaction records is reduced to include data fields for a merchant code and a transaction description; the operations further include receiving, in response to the communicating of the batch file, reconciliation data generated by the external service; the operations further include verifying the enrichment data based on the reconciliation data; and/or the reconciliation data includes one or more of a checksum, a record count, and a record width of the enrichment data.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. By employing a batch interface for enrichment of transaction data for large numbers of transactions, instead of exclusively employing an interface for individual transaction enrichment, implementations provide a mechanism that uses network capacity more efficiently, in which batch processing involves less communications overhead that individual uploads of individual transaction records for enrichment. Moreover, by filtering the transaction data prior to batch data upload (as described further below), implementations reduce the amount of data that is communicated between the third-party service and the enterprise systems described herein. Accordingly, implementations use less network bandwidth, processing capacity, active memory, storage space, and/or other computing resources compared to traditional systems. Moreover, implementations provide greater scalability compared to previously available solutions, by ensuring that, as the number of users and the amount of transaction data increases, the system continues to perform within acceptable ranges of performance metrics.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
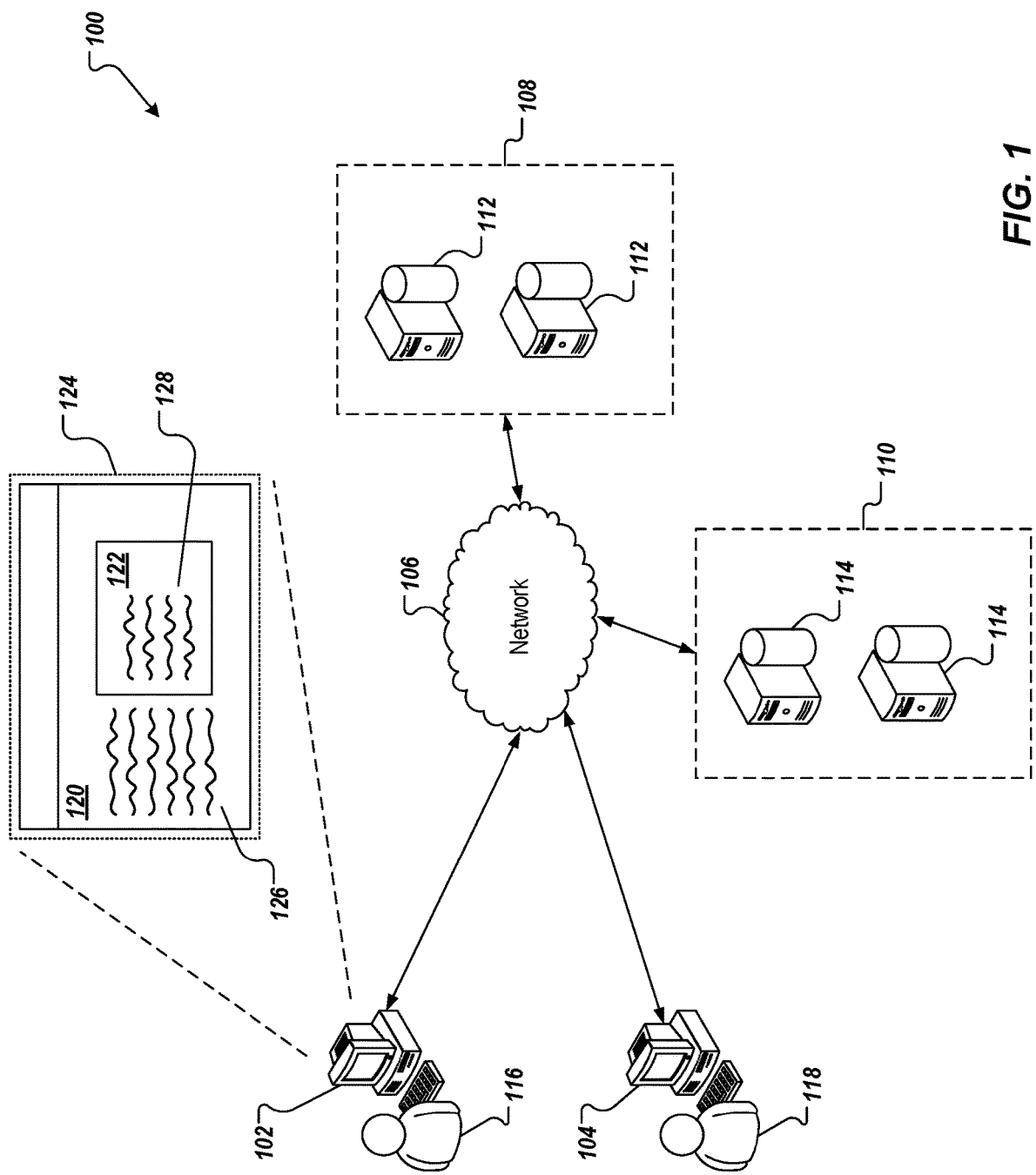
FIG. 1 depicts an example architecture that can be used to execute implementations of the present disclosure.

Implementations of the present disclosure are directed to systems, devices, methods, and computer-readable media for managing data transfer between an enterprise system and a third-party provider system, including employing a batch interface of the third-party provider (TPP) system to upload a batch of transaction data for enrichment and receiving, in response enrichment data that provides additional context regarding each of the transactions specified in the uploaded batch. In some implementations, transaction data is received that describes one or more transactions. To provide information to user(s) through personal financial management (PFM) tools provided by a financial service enterprise (FSE) system, a TPP system can be called by the FSE system to generate enrichment data associated with one or more of the transactions. The enrichment data can include a category for each transaction, a classification for each transaction, and/or other context for the transaction. In some implementations, the TPP system provides a batch interface through which the FSE system can upload a batch file of transaction data (e.g., describing multiple transactions) to the TPP system. The TPP system can analyze each transaction in the batch file and generate enrichment data for each transaction, such as by determining a classification and/or category for each transaction. The enrichment data can be sent back to the FSE system and presented to user(s) through the PFM tools.

In some instances, in addition to the batch interface, the TPP system also provides an application programming interface (API) through which individual transaction records can be submitted for real time generation of enrichment data for each transaction. For example, an individual transaction record can be uploaded through the API, which returns enrichment data for that transaction. As used herein, a real time operation may describe an operation that is performed based on a triggering event and without any intentional delay between the performed operation and the triggering event, taking into account the processing and/or communication limitations of the computing system(s) performing the operation and the time needed to initiate and/or perform the operation. The triggering event may be a received communication, a detection of a particular application state, another operation performed by the same or a different process, and so forth. A real time operation may also be described as a dynamic operation. Real time operations may include operations that are automatically executed in response to the triggering event without requiring further human input after the triggering event and before execution of the real time operation. In some examples, a real time operation may be performed within a same execution path as a process that detects and/or handles the triggering event. For example, the real time operation may be performed or initiated by code that executes as part of the handling of the event and/or in response to a message that is sent as part of the handling of the event. A real time operation may, in at least some instances, be performed synchronously with respect to the triggering event. For example, enrichment data for a transaction can be determined and returned to the FSE system in real time with respect to the transaction record being uploaded through the API, and/or in real time with respect to the execution of the transaction.

In some instances, the FSE system may be tasked with providing enrichment data for a large number of transactions every day, such as 40-50 million transactions per day. Such a high volume of data may be beyond the handling capacity of the FSE system for uploads through the individual (e.g., real time) API. Accordingly, the FSE system can provide a batch interface to which a batch file of transaction data can be uploaded for processing (e.g., not in real time) in a batch to generate enrichment data for each of the transactions in the uploaded batch file. The batch file can be analyzed by the TPP system, and each transaction record in the batch file can be analyzed using a set of rules to determine the classification, category, and/or other enrichment data for the transaction. In such implementations, the set of rules applied to the transactions records in the batch file are the same set of rules that would be applied to individual transaction records uploaded through the API.

Generating enrichment data for a transaction can include determining a category for the transaction. For example, a transaction can be analyzed to determine that it is an expenditure on gas, food, clothing, housing, utilities, travel, and/or some other category. The enrichment data can also include a classification of the transaction, such as whether the transaction describes an expenditure of funds from an account (e.g., a debit) or a receipt of funds into the account (e.g., a credit). In some instances, generation of enrichment data can include cleansing a description of a transaction to provide a redacted and/or different description that the description that was originally included in the transaction record. For example, cleansing can include removing a reference to a particular store or location where the transaction was initiated, and replacing it with a briefer and/or more generic reference to the merchant, such as replacing "S-Mart, store # 2315, Lockhart, Texas" with "S-Mart" or "S-Mart Lockhart."

The enrichment data can include an enrichment data record corresponding to each transaction record that was included in the batch file uploaded through the batch interface of the TPP system. In some implementations, the enrichment data record can include a reference to the corresponding transaction (e.g., a transaction identifier (ID)), a category ID for the transaction, a classification ID for the transaction, and/or a cleansed description for the transaction. Various PFM tools can use the enrichment data to provide a data-rich user experience for a user, by providing the enrichment data as context for the transaction history of the user. For example, transactions can be listed in a dialog, each transaction listed with its corresponding date and/or time, amount (e.g., debited or credited), and enrichment data include category, classification, and/or cleansed description. The enrichment data can also be used by PFM tools to presented enriched transaction data for financial planning, budgeting, tax return preparation assistance, financial counseling services, and so forth.

In some implementations, the communicated data does not include sensitive information such as personally identifiable information (PII), account numbers, security credentials, and so forth. In some implementations, the communicated data can be encrypted and/or compressed using a suitable encryption and/or compression technique.

The FSE system can receive, as input, a (e.g., batch) feed of transaction records each describing a transaction of a user. The feed may include transactions involving a particular user, or more than one user. For example, the transaction records feed can describe a book of records for deposit accounts, credit line accounts, and so forth. The transaction records can describe debits, credits, or both debits and credits. In some implementations, the input feed of transaction data can be compared to a list of users who have enrolled, subscribed, or otherwise opted into a PFM service to request that enrichment data be provided for at least some of their transactions. The input transaction data can be filtered to select the transactions of those users who have opted into the PFM service. A batch of input data can be received periodically, and the batch of input data can be filtered and provided to the batch interface of the TPP system for enrichment. The TPP system can then return a batch of enrichment data for the transactions in the uploaded batch. Implementations can run the batch process with any suitable frequency. For example, a batch can be run each business day, the batch including the transaction data that has been collected since the last batch was run.

The input data can be received as a comma-delimited list of records, and the batch file uploaded to the batch interface and/or enrichment data received from the batch interface can also be described using a similar format. Other suitable data formats can also be employed by implementations. The communications between the FSE system and the batch interface of the TPP system can be sent and received over a secure network connection, secured using a version of HTTPS, SCP, and/or other suitable secure communication protocols. The communicated information can also be compressed using a suitable compression technique and/or encrypted using a suitable encryption method. Encryption and decryption can be performed through a key exchange between the FSE and TPP systems.

On receiving a batch file uploaded to its batch interface, the TPP system can decrypt and/or expand the batch file in instances where the uploaded file is encrypted and/or compressed. Each record of the batch file, describing a transaction, can be imported into the enrichment process of the TPP system to generate enrichment data including categorization, classification, and/or cleansed description information. The TPP system can generate a file of enrichment data which can be sent back to the FSE system on completion of the batch processing.

In some implementations, a reconciliation process can be used to confirm that the correct amount of data has been received and processed. Reconciliation can confirm that the batch file uploaded to the batch interface has the same number of records as the enrichment data received from the TPP system, to confirm that all the uploaded data has been enriched (or an attempted at enrichment has been performed). For example, the TPP system can return reconciliation data that indicates a number of rows (records) processed, and the FSE system can compare the number of rows in the reconciliation data with the number of rows in the uploaded batch file, to determine whether the reported number of rows processed is consistent with the number of rows in the batch file uploaded to the batch interface. The reconciliation data can also include a checksum of the uploaded batch file, a size of the uploaded batch file, and/or record width of the uploaded batch file (e.g., for fixed record length uploads). In some implementations, the reconciliation data can be sent to the FSE system in a header of the enrichment data. Reconciliation can be performed on the batch file that is uploaded to the batch interface. Reconciliation can also be performed on the enrichment data that is sent from the TPP system to the FSE system.

Implementations may employ various filtering techniques to reduce the amount of data communicated between the FSE system and the TPP system, and thus reduce the amount of network bandwidth and/or other computing resources used to provide the enrichment data and/or reconciliation data. As described above, filtering can include identifying transaction records that correspond to users who have enrolled in a service to use PFM tools, such that the batch file uploaded to the TPP system includes transaction records for enrolled users. In some implementations, filtering can include omitting from the batch file those transactions that have already been successful enriched through upload to the real time API provided by the TPP system. In some implementations, the FSE system can include an event listener that monitors the return data from the real time API to identify instances in which a transaction was successfully enriched through the real time API. Such an event can be used to trigger a process to remove the corresponding transaction from the batch file prior to uploading the batch file to the batch interface for enrichment through the batch process.

In some implementations, filtering can also include reducing the number of data fields (e.g., columns) in the batch transaction data that is uploaded to the batch interface of the TPP system. For example, the FSE system can select, from the received transaction data, fields including transaction ID, merchant ID, transaction description, and/or other fields that are used by the TPP system to determine the enrichment data, and other fields can be omitted from the batch file that is uploaded to the TPP system. Moreover, to save bandwidth and other computing resources the TPP system can send to the FSE system enrichment data that is minimal in size. For example, the enrichment data can include, for each enriched transaction record, a transaction ID, a category ID, a classification ID, and the cleansed transaction description. The TPP may not be required to send back the original transaction record set. The FSE system can use the transaction ID as a key to associate the original transaction data with the enrichment data.

In some implementations, the enrichment data can identify those transactions for which the enrichment process failed, such as transactions that the TPP system was unable to determine a classification or categorization for. Such records can be retried in a subsequent batch or through the real time API, or the PFM tools can indicate those transactions as not having been classified or categorized.

Implementations of the present disclosure are described in further detail herein with reference to an example context. The example context includes a financial services provider (e.g., bank, insurance company) that provides internet-based products, and/or services to users (e.g., customers). It is contemplated, however, that implementations of the present disclosure can be realized in any appropriate context. In the example context, the financial services provider maintains transaction data. In some examples, the transaction data is representative of one or more transactions users (e.g., customers of the financial services provider) have conducted using products and/or services of the financial services provider. In some examples, the financial services provider shares at least a portion of the transaction with a third-party service provider. In some examples, the third-party service provider can provide one or more services that process the transaction data (e.g., assigning categories to transactions, providing budgeting tools).

The batch file sent to the batch interface can include, for each transaction, a record with various fields. For a card transaction, the fields can include one or more of the following: Record Type, Account Number, Transaction ID, Amount, Base Type, Action Type, Description, Member ID, Transaction Level2 Description, Post Date, Transaction Status, Transaction Date, User GUID, User ID, merchant category code, Metadata. For a bank transaction, the fields can include one or more of the following: Record Type, Action Type, member_id, account_id, Account Number, Transaction ID, Amount, Check Number, Description, Transaction Level2 Description, Post Date, Transaction Status, Transaction Date, Transaction Type, UserID, merchant category code, MetaData.

The enrichment data returned by the TPP system can include, for each transaction, an enrichment data record that includes one or more of the following fields: record type, user ID, account ID, ID, category, category GUID, account GUID, transaction GUID, description, parent GUID, parent, is_directdeposit, is_billpay, is_overdraft_fee, is_payroll_advance, is_recurring, response_code, response_message, revision code.

FIG. 1 depicts an example architecture 100 that can be used to execute implementations of the present disclosure. In the depicted example, the architecture 100 includes one or more client devices 102, 104, a server system 108, a server system 110, and a network 106. The server systems 108, 110 each include multiple servers (e.g., processors, memory) and databases (collectively referenced as 112, 114, respectively). In the context of the present disclosure, the servers 112, 114 are respective hardware and/or software platforms. In the depicted example, respective users 116, 118 interact with the client devices 102, 104. In an example context, the users 112, 114 can include users (e.g., customers, investors), who interact with a financial services platform, as described in further detail herein.

In some examples, the client devices 102, 104 can communicate with the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the internet, a cellular network, a telephone network (e.g., PSTN) or an appropriate combination thereof connecting any number of communication devices, mobile computing devices, fixed computing devices and server systems.

In some implementations, each server 112, 114 includes at least one server and at least one data store. In the example of FIG. 1, each server 112, 114 is intended to represent various forms of servers including, but not limited to a web server, an application server, a proxy server, a network server, and/or a server pool. In general, servers accept requests for application services and provide such services to any number of client devices (e.g., the client devices 102, 104 over the network 106).

In accordance with the context of the present disclosure, one or more servers 112, 114 of the server systems 108, 110 can host respective web-based applications that can be accessed by users 116, 118 using the client devices 102, 104, respectively. For example, the server system 108 can host a web-application provided by an enterprise, the web-application including one or more web pages that can be displayed in web browsers executed on the client devices 102, 104. The server system 110 can host a web-application provided by a third-party provider, the web-application including one or more web pages that can be displayed in web browsers executed on the client devices 102, 104.

In some implementations, the web-application of the enterprise can embed the web-application of the TPP. In this manner, the users 116, 118 can access products, information, and/or services of the third-party provider (i.e., the web-application of the third-party provider) through the web-application of the enterprise. For example, and as described in further detail herein, the web-application of the third-party provider can be embedded within one or more web pages of the web application of the enterprise. In some implementations, the information provided by the TPP (e.g., enrichment data) can be presented through the application, in one or more pages.

In the example context, the web-application of the enterprise can enable the users 116, 118 to access one or more accounts (e.g., savings, checking, insurance) held by the enterprise on behalf of the users 116, 118. The web-application of the third-party provider can provide one or more PFM tools based on the one or more accounts, such as, an account summary tool, a transaction summary tool, a spending analysis tool, a budgeting tool, a trends tool, a transaction categorization tool), and/or other types of tools.

In some implementations, as the user 116, 118 navigates a PFM tool embedded in a web page of the web-application of the enterprise, content that is displayed within the PFM tool changes. In some examples, content of a web page 120, and a frame 122 are coordinated. For example, a web browser 124 executing on the client device 102 (or the client device 104) displays the web page 120 with the frame 122 embedded therein. In accordance with the example context, the web page 120 can be provided by the FSE to enable users to access one or more accounts (e.g., savings, checking, insurance) held by the enterprise, and the frame 122 can enable interaction with one or more PFM tools (e.g., an account summary tool, a transaction summary tool, a spending analysis tool, a budgeting tool, a trends tool) that present enrichment information generated by the TPP. The web page 120 can display content 126, and the frame 122 can display content 128. In some examples, the content 126 can include user-specific content (e.g., account information specific to the user), and/or general content (e.g., financial advice). In some examples, the content 128 can include user-specific content (e.g., summaries/analyses of account information specific to the user), and/or general content.

As introduced above, implementations of the present disclosure are directed to onboarding of transaction data of an enterprise for use with one or more services provided by a TPP. For example, and in the example context, a FSE may seek to integrate one or more PFM tools in an application (e.g., embedding the one or more PFM tools into an application provided by the FSE). To achieve this, the TPP requires access to transaction data of the FSE. For example, transaction data can be provided to the TPP, such that the TPP can conduct analytics, summaries, provide enrichment data, and the like using the one or more PFM tools to provided relevant information to users of the FSE (e.g., summaries/analyses of account information specific to each user, assign categories to transactions).

The transaction data that is to be provided from the FSE to the TPP can be relatively large, and complex. For example, and in the financial services context, transaction data for users of the FSE can account for several millions, even billions of transactions, which can correspond to tens of thousands, and even millions of gigabytes (GB) of data, for example. In view of such large amounts of data, traditional approaches for providing the transaction data to the TPP cannot achieve the transfer in a time-efficient, accurate, and/or resource efficient manner (in terms of computing resources (processors, memory) required). For example, one traditional approach can include the TPP exposing an API, through which the FSE transfers transaction data for individual transactions (e.g., one at a time). The API-based approach can include submitting requests though the API for information (e.g., enrichment data) regarding individual transactions. Such an API-based approach, however, is inefficient in terms of time and resources for large volumes of data, and accuracy of the data transfer (i.e., fidelity of the data transferred) can be adversely affected. For example, post-transfer reconciliation of data can be hampered using an API-based approach.

Accordingly, and as described in further detail herein, implementations of the present disclosure provide for complex data transfer management to transfer data from an enterprise (e.g., FSE) to a TPP, and reconcile the data, through use of a batch process. In some implementations, the complex data transfer management of the present disclosure is time- and resource-efficient, as compared to other approaches (e.g., APIs), and provides an improved accuracy. The complex data transfer can also be described as a batch data transfer.

Figure 2:
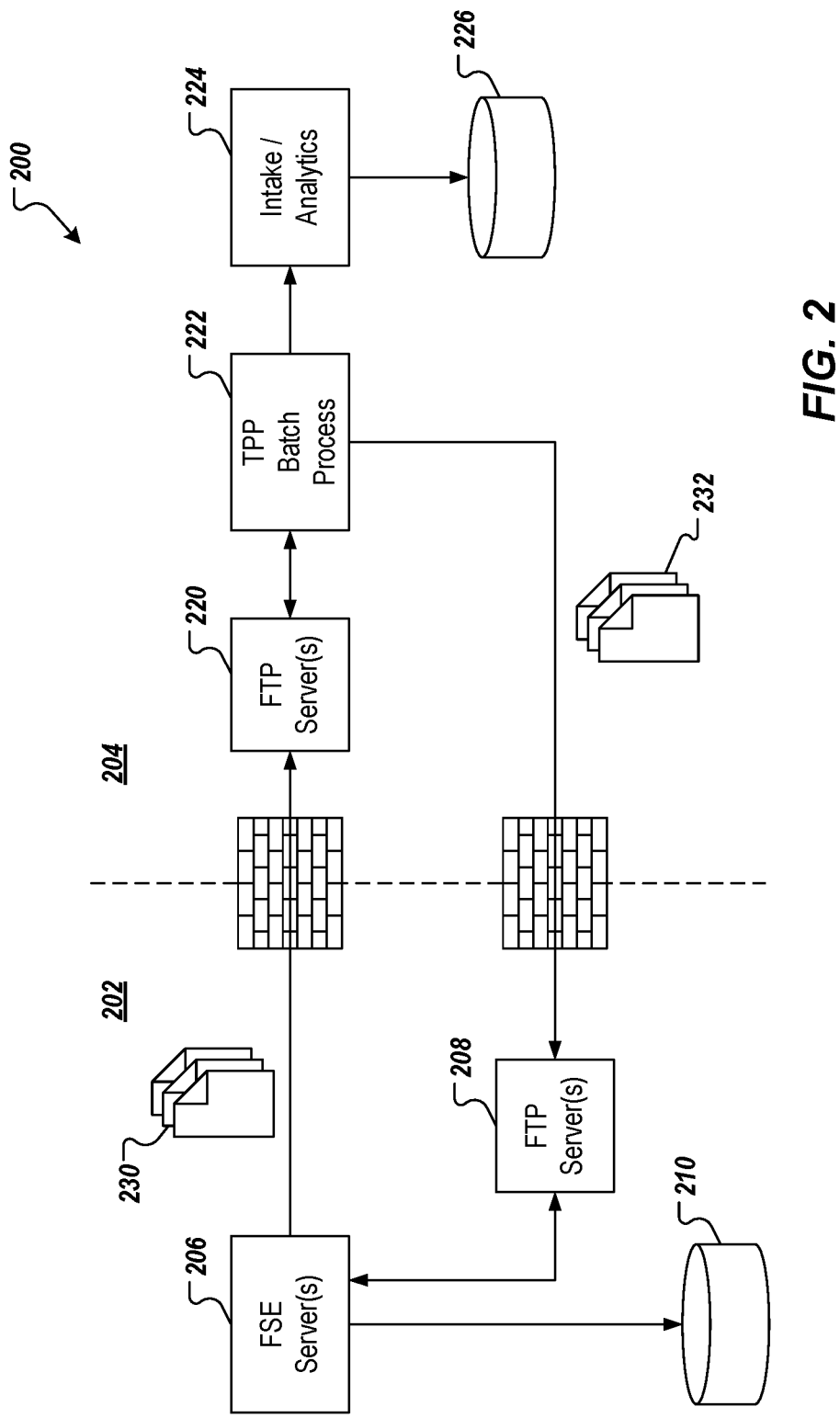
FIG. 2 depicts an example architecture in accordance with implementations of the present disclosure.

FIG. 2 depicts an example architecture 200 in accordance with implementations of the present disclosure. In some examples, and as described in further detail herein, the example architecture 200 enables a system of an enterprise (e.g., a FSE) to transfer voluminous data to a system of a TPP in a time- and resource-efficient manner, while preserving a fidelity of the data. In the depicted example, the example architecture 200 includes an FSE system 202, and a TPP system 204, which communicate with one another through a gateway (e.g., a network node that serves as an entrance between networks, acting as a proxy server and a firewall).

In the depicted example, the FSE system 202 includes one or more FSE servers 206, one or more file-transfer-protocol (FTP) servers 208, and one or more datastores 210. The TPP system 204 includes one or more FTP servers 220, one or more batch process systems 222, one or more intake/analytics systems 224, and one or more datastores 226. The FTP server(s) 220 of the TPP system 204 can also be described as a batch interface. In accordance with implementations of the present disclosure, and as described in further detail herein, the one or more FSE servers 206 provide data (e.g., transaction data) as a batch in a plurality of transmission files 230, which are transmitted to the TPP system 204. After the TPP system 204 has processed the transmission files 230, the TPP system 204 provides response data in a plurality of response files 232 back to the FSE system 202. The response file(s) 232 can include the enrichment data for the transactions in the uploaded batch file(s), and/or the reconciliation data used to confirm integrity of the file transfer process.

In some implementations, each transmission file 230 provides a format for the type of data recorded in the respective transmission file 230. In the example context of financial services, data can be representative of accounts and/or transactions. Example accounts can include, without limitation, savings account, checking account, retirement account, credit card account. Example transactions can include, without limitation, savings account transactions (e.g., deposits, withdrawals, debit card purchases), checking account transactions (e.g., deposits withdrawals, debit card purchases), retirement account transaction (e.g., deposits, withdrawals, dividend activity), credit card charges, credit card balance payments. In some examples, each transmission file 230 corresponds to an account type, and/or a transaction type, and includes respective fields for the respective types.

For example, a first transmission file 230 can be provided for savings accounts of a plurality of users (customers) of the FSE, the first transmission file 230 having a first format. A second transmission file 230 can be provided for savings account transactions of a plurality of users (customers) of the FSE, the second transmission file 230 having a second format that is different from the first format. For example, the first format can include fields used by the FSE for savings accounts (e.g., user_id, account_id, available_balance, current_balance, account_name, account_type), and the second format can include fields used by the FSE for savings account transactions (e.g., user_id, account_id, account_type, transaction_date, transaction_status, transaction_amount).

In some examples, the data can be representative of users (e.g., customers) of the FSE. For example, a transmission file 230 can be provided, which provides a record of users, and can include a field for uniquely identifying each user within the FSE system, and a field for uniquely identifying each user with the TPP system.

In some examples, each transmission file 230 includes a mapping between respective fields of the FSE and the TPP. For example, for an account, an example FSE field includes "Account Name," while a corresponding, example TPP field includes "name." As another example, for a transaction, an example FSE field includes "Post Date," while a corresponding, example TPP field includes "posted_on."

In some examples, a transmission file 230 includes a call-back suppression data. For example, a transmission file 230 can include payload data (e.g., a data flag) that instructs the TPP 204 to suppress call-back requests to the FSE 202 for transactions listed in the transmission file 230. In some implementations, transmission files 230 submitted with requests for real time generation of enrichment data can include call-back suppression data.

In some implementations, each response file 232 provides a format for the type of data recorded in the respective response file 232. In some implementations, each response file 232 provides reconciliation, and enrichment data, as described in further detail herein. In some examples, each response file 232 corresponds to an account type, or a transaction type, and provides respective FSE fields, and TPP fields. In some examples, and as described in further detail herein, the FSE system 202 processes the response files 232 to reconcile data as between the FSE system 202, and the TPP system 204. For example, data stored in the FSE system 202 can be updated to reflect changes implemented in the TPP system 204. Further, the FSE system 202 processes the response files 232 to enrich data based on enrichment data added by the TPP system 204.

Example enrichment data can include labels that the TPP has assigned to transaction data, in the example context. Example labels can correspond to entities, categories, classifications, and/or transaction types that each transaction is assigned to. For example, transactions relating to purchase of goods can be assigned one or more labels indicating an entity, at which the purchase was made (e.g., ACME Clothing Company; Generic Gas Station), a category (e.g., shopping; vehicle), and a transaction type (e.g., online payment; point-of-sale (POS)).

In some implementations, the TPP batch process systems 222 receive the transmission files 230 from the FTP servers 220. In some examples, the TPP batch process systems 222 provides transaction data to the intake/analytics system 224, which process the transaction data using one or more techniques to analyze the transactions, and provide enrichment data. In some examples, the intake/analytics system 224 provides enrichment data back to the TPP batch process 222 (e.g., one or more data files mapping transaction data from the FSE to data provided by the TPP, such as unique identifiers uniquely identifying users within the respective systems). The TPP batch process 222 provides the response files based on the enrichment data. In some implementations, the FSE system 202 processes the response files to reconcile the transaction data within the FSE system, as described in further detail herein.

Figure 3:
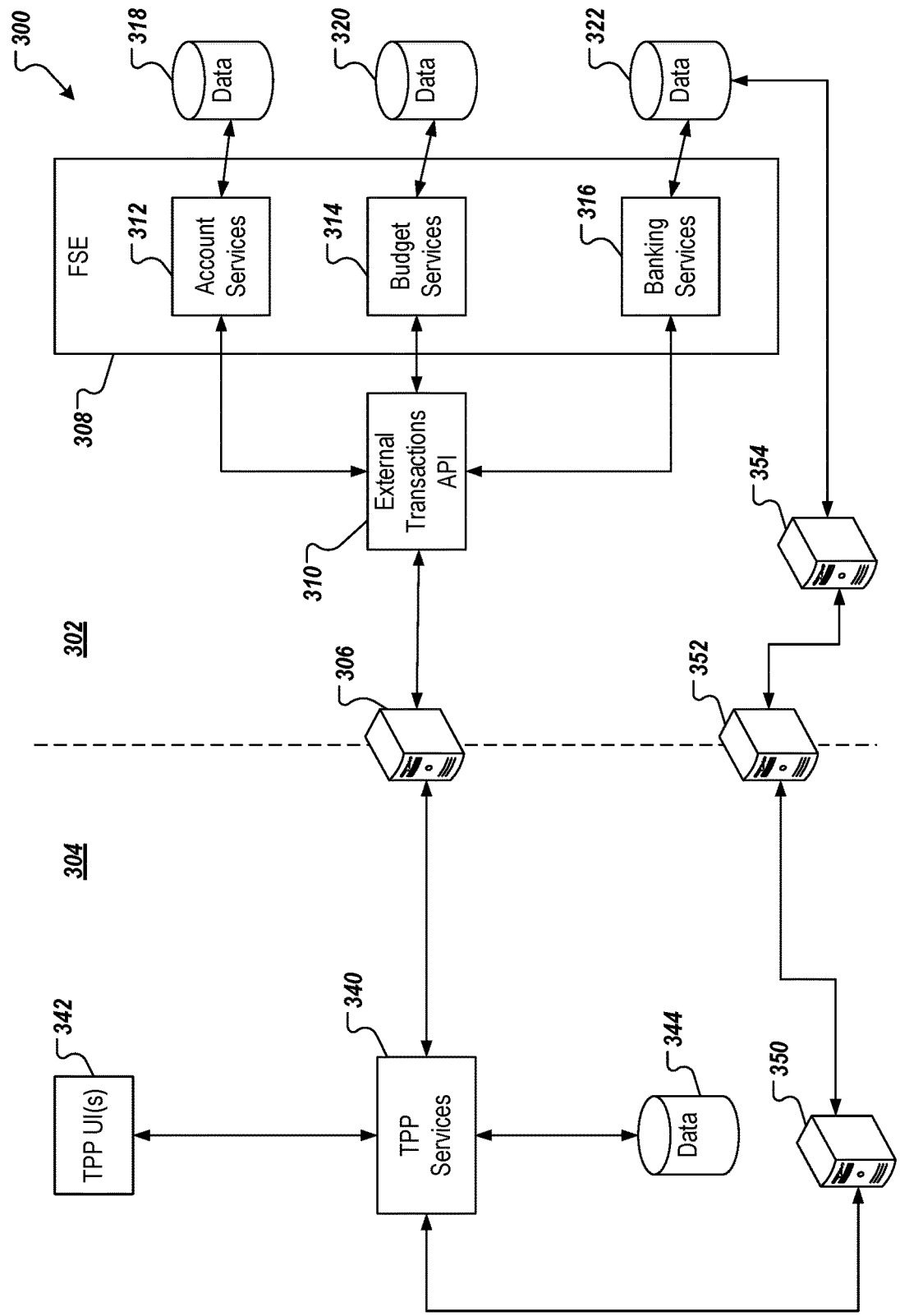
FIG. 3 depicts an example architecture in accordance with implementations of the present disclosure.

FIG. 3 depicts an example architecture 300 in accordance with implementations of the present disclosure. In some examples, and as described in further detail herein, the example architecture 300 enables a system of an enterprise (e.g., a FSE) and a system of a TPP to update one another based on user interactions with the respective systems. In the depicted example, the example architecture 300 includes a FSE system 302, and a TPP system 304, which communicate with one another through a gateway 306 (e.g., a network node that serves as an entrance between networks, acting as a proxy server and a firewall).

In the example of FIG. 3, the FSE system 302 includes a set of services 308 that communicate with the TPP system 304 through an external transactions API 310. In some examples, the FSE exposes the external transactions API 310 to enable services of the set of services 308 to be updated based on transactions in the TPP system 304, as described in further detail herein. The set of services 308 includes one or more computer-implemented services that the FSE provides to its users. In accordance with the example context, the set of services 308 include account services 312, budget services 314, and banking services 316. In some examples, each service communicates with a respective data store 318, 320, 322. Although distinct data stores are depicted, it is contemplated that a single data store can be provided, with which, each of the services interact (e.g., read data from, write data to).

In some examples, the account services 312 enable a user to access account information (e.g., savings, checking) stored in the data store 318. For example, the user can view a list of accounts, activities, balances, and the like (e.g., in the web page 120 of FIG. 1). In some examples, the budget services 314 enable a user to access budgeting information (e.g., budgets, goals) stored in the data store 320. For example, the user can view a list of budgets, goals, and the like (e.g., in the web page 120 of FIG. 1). In some examples, the banking services 316 enable a user to execute banking activities (e.g., transferring funds to/from accounts) based on information stored in the data store 322.

Although not depicted in FIG. 3, the example architecture 300 can also include an advice service infrastructure (ASI). An example ASI can provide advice (e.g., budgeting advice, financial planning advice). In some examples, the determines at least a portion of content that is to be displayed in a web page (e.g., at least a portion of the content 126 that is to be displayed in the web page 120 of FIG. 1). For example, the ASI can determine that budgeting advice is to be displayed as at least a portion of the content of a web page. Consequently, the web page can receive the budgeting advice from a database.

The TPP system 304 hosts computer-implemented services 340, with which users of the FSE system 302 can interact. Continuing with the example context, example services 340 can include PFM tools, such as, for example, an account summary tool, a transaction summary tool, a spending analysis tool, a budgeting tool, and a trends tool. In some implementations, interactions with the TPP services 340 are conducted through one or more TPP UIs 342. For example, and with reference to FIG. 1, the one or more TPP UIs 342 can be displayed in the frame 122 embedded in the web page 120, as described herein. In some examples, the TPP services 340 interact with data stored in a data store 344 of the TPP system 304. In some examples, data stored in the data store 344 can include user data provided from the FSE system 302, and/or data provided by the one or more TPP services 340 (e.g., budget data, trend data, categories, etc. generated by the TPP service(s) 340).

In general, the example architecture of FIG. 3 depicts interactions between the FSE system 302, and the TPP system 304 at the service layer. More particularly, example layers can include a UI layer, a service layer, and a data layer. The example architecture 300 of FIG. 3 represents communication between the FSE system 302, and the TPP system 304 at the service layer (e.g., as opposed to interactions between the FSE system 302, and the TPP system 304 occurring between respective UIs at the UI layer, and/or between respective database systems at the data layer). In this manner, the TPP services 340 hosted in the TPP system 304 update (in real-time) services of the set of service 308 in the FSE system. In some examples, real-time describes actions that can be automatically executed, without requiring human input and without any intentional delay, taking into account the processing limitations of the data input service, and any time required to process data.

In some implementations, user navigation within the frame 122 can be informed to the FSE system 302, such that the content 126 of the web page 120 can be selectively updated (e.g., in response to updates to the content 128 changing as a result of navigation within the frame 122). In this manner, the context of the content 126 (e.g., budgeting) can align with (e.g., be the same as) the context of the content 128, as the content 128 changes in response to user navigation within the frame 122 (e.g., the user moving from a budgeting tool to a financial planning tool).

In some implementations, page content (e.g., the content 126 of FIG. 1) is coordinated with in-frame content (e.g., the content 128 of FIG. 1) using real-time updates at the service layer. In some implementations, real-time updates are provided through update messages communicated from a TPP service (e.g., the TPP services 340 of FIG. 2) to a FSE system (e.g., the FSE system 302 of FIG. 3). In some implementations, the update messages are provided as so-called WebHooks. A WebHook can be described as a hypertext transfer protocol (HTTP) callback that occurs in response to an event. In some examples, a HTTP POST message (e.g., POST update) is sent from the TPP system to the FSE system in response to an event. In general, using WebHooks, a web application (e.g., the TPP services 340 of FIG. 3) POST a message to a URL (e.g., of the external transaction API 310 of FIG. 3) when an event occurs.

In some examples, each message (e.g., POSTupdate message) includes a payload that provides data descriptive of the event that triggered sending of the message. Example data can include, without limitation, category data, description data, user ID data, and UI ID data. In some examples, the category data indicates a category of the event. Example categories can include, without limitation, navigation (e.g., navigating from one TPP UI (budgeting tool) to another TPP UI (account summary tool)), and data update (e.g., updating data within a displayed TPP UI). In some examples, the description data includes a description of the event (e.g., navigating between TPP tools, updating budget data, updating account data). In some examples, the user ID includes an identifier uniquely identifying the user in the TPP system and the FSE system (e.g., the user 116 of FIG. 1 interacting with the FSE system 302 through the web page 120, and the TPP system 304 through the frame 122). In some examples, the UI ID data includes an identifier uniquely identifying a TPP UI that the user was interacting with (and/or navigated to), which triggered the event.

In some examples, a set of events can be provided and registered with the TPP services, and, for each event, payload contents can be defined. For example, an example event can include a navigation event, and the payload can be defined to include: EventType=navigation; Desc=navigating between UIs; UserID=A1B2C3D4; OriginUI_ID=QRS; DestinationUI_ID=XYZ. Consequently, in response to occurrence of a navigation event, an update message is sent from the TPP system to the FSE system, and includes the defined payload. If, however, an event occurs that is not included in the set of events, no update message is sent from the TPP system to the FSE system for that event.

In some examples, the FSE system receives the update message, and updates one or more services in response thereto. More particularly, and in accordance with implementations of the present disclosure, the FSE system updates content within a page (e.g., the content 126 of the web page 120) in response to an update message indicating occurrence of an event initiated through a frame embedded in the page (e.g., the frame 122 embedded in the web page 120).

For example, the user can interact with a budgeting tool (e.g., a TPP service 340) through a budgeting tool UI (e.g., a TPP UI 342) that is displayed in a frame of a page (e.g., the frame 122 embedded in the web page 120) provided by a FSE (e.g., the FSE system 204). The user can navigate from the budgeting tool to an account summary tool (e.g., a TPP service 340) within the frame, and in response, an account summary tool UI (e.g., a TPP UI 342) is displayed in the frame of the page. In response to the navigation between tools, the TPP system recognizes occurrence of a navigation event, determines that the navigation event is included in the set of events, and sends a corresponding update message to the FSE system, as described herein.

The FSE system receives the update message from the TPP system, and processes the update message to selectively update content within the page. For example, prior to the navigation event, the content of the page includes content associated with budgeting (e.g., general advice for creating and maintaining a budget). In response to the navigation event, the content of the page is changed to include content associated with account summaries.

In some implementations, the content that is to be displayed in the page (e.g., the content 126 of the web page 120) can be determined based on the type of event. For example, if it is determined that the event was a navigation event to a retirement planning UI within the frame, retirement planning content can be retrieved (e.g., from the ASI system), and can be displayed as the content in the page. Accordingly, general content (e.g., user-agnostic content) is displayed. In some implementations, the content that is to be displayed in the page can be determined based on the particular user. For example, if it is determined that the event was a data update event within a budgeting tool UI within the frame, budgeting information of the user can be retrieved (e.g., from the budget services 314 of FIG. 3), and can be displayed as the content in the page. Accordingly, user-specific content is displayed.

This process can repeat in response to user interactions (e.g., navigation) within the frame 122 to continuously update the content 126 in response to changes in the context of the content 128 to ensure that the contexts align (e.g., if budget-related content is displayed in the frame 122, budget-related content is displayed in the web page 120; if retirement-related content is displayed in the frame 122, retirement-related content is displayed in the web page 120).

With continued reference to FIG. 3, the example architecture 300 further includes a batch processing server 350 (e.g., a server 222 of FIG. 2), an enterprise server 352 (e.g., business-to-business (B2B) server), and a host server 354 (e.g., a server 206 of FIG. 2). In some implementations, the servers 350, 352, 354 coordinate the batch transfer of data and error reconciliation, as described in detail herein. For example, during initial onboarding of transaction data to the TPP system 304, the server 354 provides a plurality of transmission files (e.g., the transmission files 230 of FIG. 2) to the server 350 through the server 352. In some examples, the server 350 provides the transmission files to the TPP services 340, which processes the transmission files, and the transaction data stored therein, to provide the enrichment data. In some examples, the enrichment data is used to at least partially populate a plurality of response files (e.g., the response files 232 of FIG. 2), which the server 350 transmits to the server 354 through the server 352.

In some implementations, the server 354 processes the response files through a reconciliation process to ensure fidelity and accuracy of the transaction data, and corresponding enrichment data provided therein. In some examples, each reconciled transaction is stored back into an underlying data store (e.g., the data store 322, as depicted in the example of FIG. 3). In some examples, reconciliation can be attempted one or more times, and, if a transaction cannot be reconciled, the transaction data, and corresponding enrichment data are queued for manual reconciliation.

In accordance with implementations of the present disclosure, and as introduced above, the example architecture of FIG. 3 enables users to access and manipulate transaction data of the FSE system 302 through the TPP system 304 (e.g., through the TPP UI(s) 342), and updating of the transaction data within the FSE system 302. As described herein, and as depicted in FIG. 3, these interactions occur at the service layer, as opposed to the interface layer. In this manner, security of communication between the FSE system 302, and the TPP system 304 is enhanced (e.g., as compared to interface layer techniques, such as iframes).

For example, and as introduced above, in response to a user interaction with transaction data through a TPP UI 342, a message (e.g., POSTupdate message) is provided, and a service of the FSE system 302 (e.g., a REST service) is called. The FSE system 302 receives the message through the external transaction API 310, and an update process is performed to update transaction data within the appropriate FSE service 308. In some examples, an update can effect multiple services 208. In some implementations, the update is attempted one or more times. If the update is unsuccessful, the update data is queued for manual updating.

Figure 4:
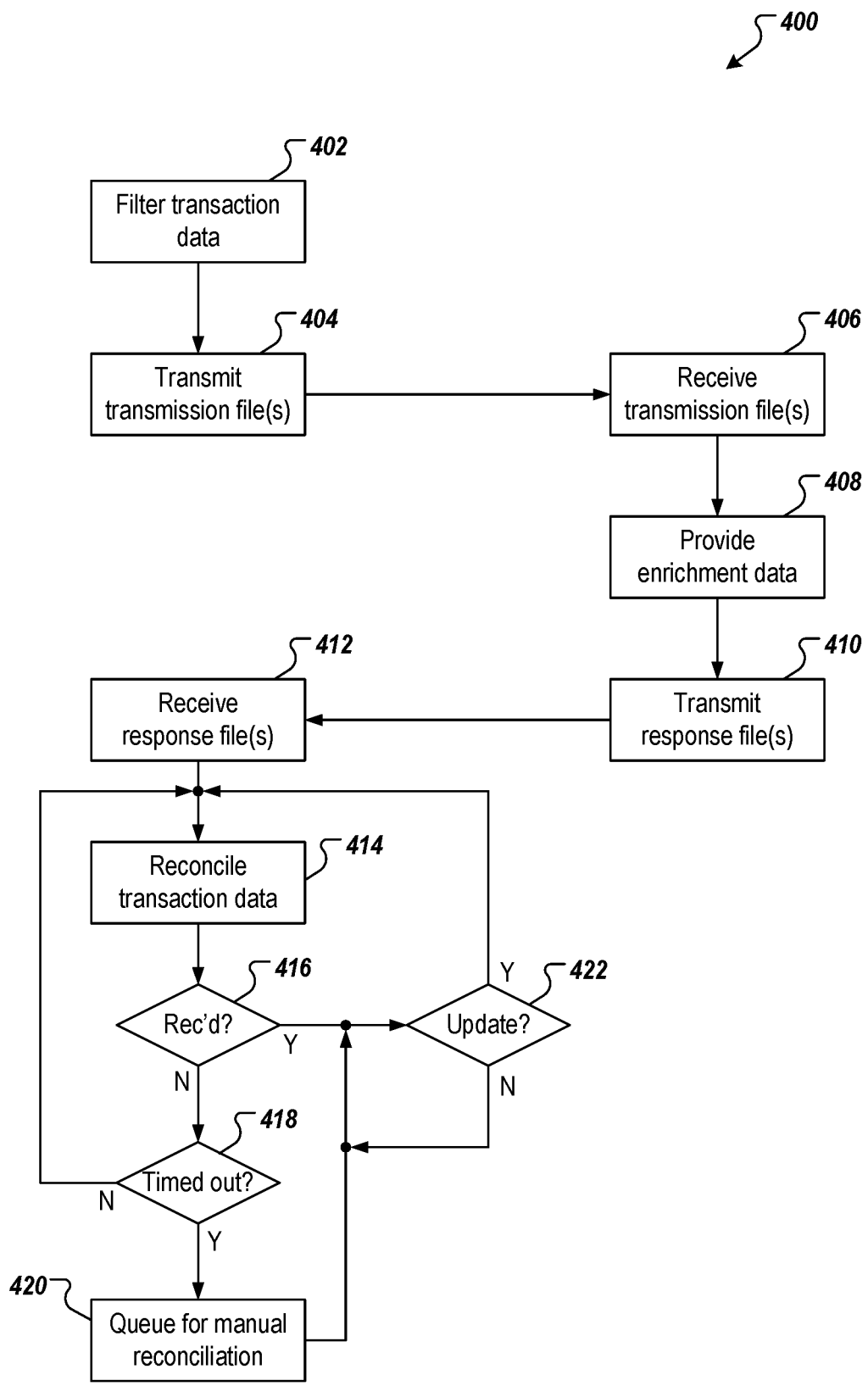
FIG. 4 depicts an example process that can be executed in accordance with implementations of the present disclosure.

FIG. 4 depicts an example process 400 that can be executed in accordance with implementations of the present disclosure. In some examples, the process 400 is provided by one or more computer-executable programs executed by one or more computing devices.

Transaction records are received, and filtered (402) to determine which transaction records are to be included in the batch file sent to the batch interface of the TPP system. As described above, filtering can include selecting those transactions that correspond to enrolled users, and/or omitting those transactions that have already been processed through the real time API. Filtering can also include reduce record width by including a subset of the fields (columns) of the transaction data in the records that are uploaded for batch processing, as described above.

One or more transmission files are transmitted (404). For example, and as described herein with reference to FIG. 2, the FSE server 206 of the FSE system 202 transmits the transmission files 230 to the FTP server 220 of the TPP system 204. The transmission files can include the batch data uploaded to the batch interface. The one or more transmission files are received (406) (e.g., by the batch interface). For example, the one or more transmission files 230 are received by the FTP server 220. Enrichment data is provided (408). For example, the TPP batch process 222, and/or the intake/analytics system 224 processes transaction data of the transmission files 230 to provide the enrichment data.

One or more response files are transmitted (410). For example, the TPP batch process 222 transmits the response files 232 to the FTP server 208 of the FSE system 202. The response file(s) can include the enrichment data and/or reconciliation data, as described above. The one or more response files are received (412). For example, the one or more response files 232 are received by the FTP server 208. Transaction data is reconciled (414). For example, the FSE system 202 processes data provided in the response files 232 with transaction data recorded in the FSE system 202 to reconcile the transaction data with the enrichment data, for example. In this manner, the transaction data recorded in the FSE system 202 can be updated to accurately reflect the enrichment data for respective transactions.

It is determined whether the transaction data has been reconciled (416). If the transaction data has not been reconciled, it is determined whether a time out condition has been met (418). An example time out condition can include attempting reconciliation of the transaction data a threshold number of times. If the time out condition has not been met, the example process 400 loops back to continue attempting data reconciliation. If the time out condition has been met, transaction data that has been unable to be reconciled is queued for manual reconciliation (420).

For transaction data that has been reconciled, it is determined whether an update has occurred (422). For example, and as described herein with reference to FIG. 3, a user can interact with transaction data through the TPP system 304. For example, the user can access the TPP UI 342 (e.g., through a web application of the FSE system 302 that embeds the TPP UI 342), which interaction can result in an update. In response, an update message (e.g., a HTTP POST message) is provided from the TPP system 304 to the FSE system 302. The FSE system 302 processes a payload of the update message to reconcile transaction data, as described herein.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the architectures 100, 200, 300 of FIGS. 1, 2, and 3, respectively, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs (i.e., one or more modules of computer program instructions) encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA, an ASIC).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method performed by at least one processor of an enterprise system, the method comprising:
   receiving, by the at least one processor of the enterprise system, transaction records that are each associated with a transaction;
   filtering, by the at least one processor of the enterprise system, the transaction records to select a subset of the transaction records, the filtering comprising:
      selecting, from the transaction records, a first subset of transaction records that are associated with transactions that involve users listed in a subscriber database of the enterprise system,
      monitoring enrichment data previously received from an external service system,
      identifying, based on the monitored enrichment data, among the first subset of transaction records, at least one transaction record that was previously enriched, and
      responsive to identifying that the at least one transaction record was previously enriched, excluding the at least one transaction record from the first subset of transaction records to obtain the subset of the transaction records;
   encrypting the transaction records in the subset using a key exchange between the enterprise system and the external service system; and
   communicating, by the at least one processor over a secure network connection, to a batch processing interface of the external service system, a batch file that includes the encrypted transaction records and, in response, receiving enrichment data generated by the external service system, the enrichment data including enrichment data records that each describes a respective transaction associated with a respective one of the subset of the transaction records.

2. The method of claim 1, wherein:
   the external service system further provides a real time processing interface and is configured to generate a respective individual enrichment data record in real time for each individual transaction record received through the real time processing interface; and
   the filtering includes selecting the subset of the transaction records for which an individual enrichment data record has not already been generated based on a request to the real time processing interface.

3. The method of claim 1, further comprising:
   reducing, by the at least one processor, a width of the subset of the transaction records, prior to communicating the batch file to the batch processing interface of the external service system, by removing at least one data field from each of the subset of the transaction records.

4. The method of claim 3, wherein each of the subset of the transaction records is reduced to include data fields for a merchant code and a transaction description.

5. The method of claim 1, further comprising:
   receiving, by the at least one processor, in response to the communicating of the batch file, reconciliation data generated by the external service system; and
   verifying, by the at least one processor, the enrichment data based on the reconciliation data.

6. The method of claim 5, wherein the reconciliation data includes one or more of a checksum, a record count, and a record width of the enrichment data.

7. A system comprising:
   at least one processor of an enterprise system; and memory communicatively coupled to the at least one processor of the enterprise system, the memory storing instructions which, when executed by the at least one processor, cause the at least one processor of the enterprise system to perform operations comprising:
receiving transaction records that are each associated with a transaction;
filtering the transaction records to select a subset of the transaction records, the filtering comprising:
selecting, from the transaction records, a first subset of transaction records that are associated with transactions that involve users listed in a subscriber database of the enterprise system,
monitoring enrichment data previously received from an external service system,
identifying, based on the monitored enrichment data, among the first subset of transaction records, at least one transaction record that was previously enriched, and
responsive to identifying that the at least one transaction record was previously enriched, excluding the at least one transaction record from the first subset of transaction records to obtain the subset of the transaction records;
encrypting the transaction records in the subset using a key exchange between the enterprise system and the external service system; and
communicating, over a secure network connection, to a batch processing interface of the external service system, a batch file that includes the subset of the encrypted transaction records and, in response, receiving enrichment data generated by the external service system, the enrichment data including enrichment data records that each describes a respective transaction associated with a respective one of the subset of the transaction records.

8. The system of claim 7, wherein:
the external service system further provides a real time processing interface and is configured to generate a respective individual enrichment data record in real time for each individual transaction record received through the real time processing interface; and
the filtering includes selecting the subset of the transaction records for which an individual enrichment data record has not already been generated based on a request to the real time processing interface.

9. The system of claim 7, the operations further comprising:
reducing a width of the subset of the transaction records, prior to communicating the batch file to the batch processing interface of the external service system, by removing at least one data field from each of the subset of the transaction records.

10. The system of claim 9, wherein each of the subset of the transaction records is reduced to include data fields for a merchant code and a transaction description.

11. The system of claim 7, the operations further comprising:
receiving, in response to the communicating of the batch file, reconciliation data generated by the external service system; and
verifying the enrichment data based on the reconciliation data.

12. The system of claim 11, wherein the reconciliation data includes one or more of a checksum, a record count, and a record width of the enrichment data.

13. One or more non-transitory computer-readable storage media storing instructions which, when executed by at least one processor of an enterprise system, cause the at least one processor of the enterprise system to perform operations comprising:
receiving transaction records that are each associated with a transaction;
filtering the transaction records to select a subset of the transaction records, the filtering comprising:
selecting, from the transaction records, a first subset of transaction records that are associated with transactions that involve users listed in a subscriber database of the enterprise system,
monitoring enrichment data previously received from an external service system,
identifying, based on the monitored enrichment data, among the first subset of transaction records, at least one transaction record that was previously enriched, and
responsive to identifying that the at least one transaction record was previously enriched, excluding the at least one transaction record from the first subset of transaction records to obtain the subset of the transaction records;
encrypting the transaction records in the subset using a key exchange between the enterprise system and the external service system; and
communicating, over a secure network connection to a batch processing interface of the external service system, a batch file that includes the encrypted transaction records and, in response, receiving enrichment data generated by the external service system, the enrichment data including enrichment data records that each describes a respective transaction associated with a respective one of the subset of the transaction records.

14. The one or more non-transitory computer-readable storage media of claim 13, wherein:
the external service system further provides a real time processing interface and is configured to generate a respective individual enrichment data record in real time for each individual transaction record received through the real time processing interface; and
the filtering includes selecting the subset of the transaction records for which an individual enrichment data record has not already been generated based on a request to the real time processing interface.

15. The one or more non-transitory computer-readable storage media of claim 13, the operations further comprising:
reducing, a width of the subset of the transaction records, prior to communicating the batch file to the batch processing interface of the external service system, by removing at least one data field from each of the subset of the transaction records.

16. The one or more non-transitory computer-readable storage media of claim 15, wherein each of the subset of the transaction records is reduced to include data fields for a merchant code and a transaction description.

17. The one or more non-transitory computer-readable storage media of claim 13, the operations further comprising:
receiving, in response to the communicating of the batch file, reconciliation data generated by the external service system; and verifying the enrichment data based on the reconciliation data.

\* \* \* \* \*